Dec. 7, 1937. J. Y. BLAZEK ET AL 2,101,569
SURFACE FORMING MACHINE
Filed Jan. 20, 1934 8 Sheets-Sheet 1

INVENTORS
J. Y. Blazek and A. G. Anderson
By C. J. Henkel ATTORNEY

Fig 4

Patented Dec. 7, 1937

2,101,569

UNITED STATES PATENT OFFICE 2,101,569

SURFACE FORMING MACHINE

John Y. Blazek, Maple Heights, and Russell G. Anderson, Cleveland, Ohio, assignors to Lempco Products, Inc., Bedford, Ohio Application January 20, 1934, Serial No. 707,488

28 Claims. (Cl. 29—28)

The present invention relates to means for forming surfaces on work, either regular or irregular or uneven.

The present invention contemplates principally moving of work positionally during operation thereon by a stock removing means to form either regular or irregular or even or uneven surfaces on the work; automatically moving the work positionally during operation thereon for forming of such surfaces; and providing necessary or convenient means in connection with this surface forming for smooth and efficient operation of the surface forming means.

An object of the present invention is to provide a stock removing machine with means to move work relative to a positionally fixed, operating stock removing means for forming on work, surface of regular or irregular contour.

Another object of the present invention is to provide a stock removing machine with means to move work while a positionally fixed, operating stock removing means is operating thereon to form on work, surface of regular or irregular contour.

Another object of the present invention is to provide a surface forming machine with a stock removing means which is adjustable for operation thereof on differently sized work and for compensating for wear thereof.

Another object of the present invention is to provide a stock removing machine with a longitudinally movable table and a work carrying means movable transversely of the movement of the table while the same is moving longitudinally to move work for forming surface thereof.

Another object of the present invention is to provide a stock removing machine with a rotatable, laterally movable, work engaging spindle and to provide means to move the spindle laterally during rotation thereof for surface forming of work engaged thereby.

Another object of the present invention is to provide a stock removing machine with a rotatable, laterally movable, work engaging spindle and with speed change means for rotation of the spindle and with means to automatically move the spindle laterally during rotation thereof to form surface on work engaged thereby.

Another object of the present invention is to provide a stock removing machine with a stock removing means which is driven by an individual motor through one or more belt means arranged to afford efficient drive for the stock removing means and substantially vibrationless operation thereof.

Another object of the present invention is to provide a stock removing machine with an efficient lubrication means for the stock removing means which lubrication means is driven by an individual motor so that the lubrication can be varied and stopped and started at will.

Another object of the present invention is to provide a stock removing machine with individual motors each to drive one of the driven elements of the machine.

Other objects will be mentioned and pointed out in this specification or will become obvious and apparent or suggest themselves upon an inspection of this specification and the accompanying drawings.

The present invention is illustrated in the accompanying drawings forming part of this specification and showing a machine for forming the outer circumferential surfaces of pistons with reliefs therein.

In said accompanying drawings.

Similar reference characters refer to similar parts throughout the views.

The machine shown in the accompanying drawings is designed to form or to finish the outer circumferential surface of articles such as pistons, either truly round or eccentric or a combination of round and eccentric or in other formations.

The bed A is designed to rest on a floor and has mechanism therein and thereon to be described below.

The table B is longitudinally slidable on the bed A and has mechanism thereon to be described below.

The bed A has the V-shaped groove or runway 10 longitudinally in the top thereof and is located toward the back of the machine and also has the bearing face 11, parallel with the groove 10 located toward the front of the machine. The bearing face 11 is angular for better centralizing of the table on the bed.

The table B has the V-shaped projection 12 on the bottom thereof to fit into the groove 10 and also has the face 13 to bear onto the face 11. The angular drain plate 14 extends between the bed and the table and the vertical drain plate 15 is secured onto the table and extends down below the top of the bed and clears the same sidewise. The angular drain plate 16 extends between the bed and the table. The objects of these drain plates are to prevent foreign substance from getting into the bearings between the bed and the table.

The apron 17 projects from the work carrying member or cradle C, to be described below, and extends sufficiently far sidewise outwardly to clear the plate 15 when the cradle moves transversely of the bed and extends downwardly to substantially the top of the plate 15. The object of this apron is to drain foreign substance, such as chip or emery laden lubricating liquid away from the joint between the bed and the table.

The bed also has guide ways 18 on the top thereof and extends transversely of the bed to guide the below described carriage D in its travel transversely of the bed to move the machining tool toward and away from the work carrying spindle.

The bracket 19 is secured to the bottom of the carriage D and has an internal thread for the screw 20 which extends through the bed and outwardly thereof at the front of the machine. The hand wheel 21 is secured to the front end of the screw 20 to rotate the same and thereby move the carriage D transversely of the table and of the bed and toward and away from the below described work carrying spindle for adjustment thereof for machining work of different diameters.

The pan 22 is mounted in and supported by the bed to carry lubricant for use in machining or forming of work. The pan 22 has the division wall 23 therein to divide the pan into two compartments 22a and 22b which constitute, respectively, the lubricant receiving and the lubricant dispensing compartments. The wall 23 has the hole 24 through the same near the top thereof so that the more solid parts, such as chips, emery and the like, which may enter the compartment 22a with the lubricant will settle and collect in the bottom of the compartment 22a due to gravity and substantially clear lubricant will flow into the compartment 22b through the hole 24.

The cover 25 closes the top of the compartment 22b and is shown as having the sleeve 26 integral therewith and extending into the compartment 22b and having the pump casing 27 on the inner end thereof. The inlet 28 of the casing is located below the hole 24 and the outlet 29 of the casing is connected to the piping 30 which feeds and discharges lubricant for forming surfaces.

The motor E is centralized on the cover 25 as shown and the armature shaft E1 thereof extends through the sleeve 26 and into the casing 27. The shaft E1 is journaled in the bushing 31 which is mounted in the sleeve 26 as shown. The bushing 31, preferably, is made of material which resists the action of whatever substances may be in or mixed with the lubricant which substances may have a detrimental effect on the bushing and its journaling property. It has been found that lignum vitae is a material which is quite advantageous for the bushing since the same retains a good journal and is substantially free of corrosive action by the lubricant.

The rotor E2 of the pump is located within the casing 27 and is secured to the end of the armature shaft E1 as shown to rotate therewith and thereby pump lubricant out of the compartment 22b and into the piping 30 for discharge thereby for forming surfaces of work.

The trough 32 on the bed has the spout 33 vertically above the compartment 22a to collect lubricant and to lead the same into this compartment 22a of the pan 22.

The carriage D is guided on and by the guide ways 18 as mentioned above. The motor F is mounted on the carriage D to move therewith. The tool supporting means G and the grinding wheel supporting means H are also mounted on the carriage D.

In some instances it may be sufficient to use only the grinding wheel 34. In other instances, only the tool 35 may be sufficient.

In some instances it may be desirable to use cutting and grinding.

The grinding wheel 34 is mounted on one end of the shaft 36 which is journaled in the bracket 37 by means of the ball bearings 38 as shown.

The pulley 39 is mounted on the other end of the shaft 36 to rotate therewith and has a plurality of V shaped belt grooves 40 therein. Four such grooves are shown so that four belts may be used when desired. In this instance, we show two belts 42. One belt may be used and the number of belts may be increased according to power required to drive the grinding wheel as desired or necessary. The belts are V shaped cross-sectionally to attain the most possible belt and pulley contact for the width of the belt and pulley. V belts stay in their grooves and do not move sidewise and probably off of the pulley as flat belts often do. This ability to use one belt or a number of them increases the efficiency of the drive for the grinding wheel since the power required for belt flexing, particularly over small diameter pulleys, is reduced to just sufficient for driving the grinding wheel and additional belts are added only when required for driving the grinding wheel.

The belts 42 pass over the pulley 43 which is secured to and rotates with the armature shaft of the motor F mounted on the movable carriage D so that the axis of the motor and the axis of the grinding wheel shaft 36 always remain the same distance from each other and thereby do not affect the tightness and looseness of the belts 42.

The use of a plurality of V belts is one of the important features of the present invention in that the number of belts can be changed to suit requirements as to driving power needed and affords a means for reducing vibrations in the tool means during operation thereof. This reducing of vibrations is also an important feature of the present invention particularly when a surface is to be reproduced accurately.

The belts can be exchanged from one set of grooves to another and arranged in other manners to attain driving contact with the pulleys with the least amount of vibration being caused thereby in the tool means.

Manipulation of the screw 20 moves the carriage D transversely of the table and of the bed and thereby moves the tool means toward and away from the work to afford adjustment of the tool means relative to the work and for operating on differently sized work.

The bosses 44 and 45 are shown integral with the table B. The pivot shaft 46 has the ends thereof mounted in the bosses.

The bushing 47 is axially movable in the boss 45 and has a taper bore fitting to the taper part 461 of the shaft 46. The washer 48 abuts the outer end of the boss 45 and has an internally threaded hole centrally through the same. The screw 49 is threaded into the internal threaded hole and the inner end thereof abuts the bushing 47. The lock nut 50 is threaded onto the screw 49 and abuts the outer end of the washer 48 and has a series of holes 501 therein for a spanner wrench to tighten the lock nut against the washer 48. Means not shown in the drawings may be and preferably are provided to retain the shaft 46 from rotating the lock nut relative to the shaft.

The bushing 51 is driven into the boss 44 and has a taper bore fitting to the taper part 462 of the shaft 46. The washer 463 closes and abuts the outer end of the boss 44.

Rotation and endwise movement of the washer 48 is prevented by the screws 481 which hold the washer 48 in abutment on the outer end of the boss 45. This structure prevents not only rotation of the washer 48 but also prevents axial movement of the pivot shaft 46 when the screw 49 is not being manipulated.

Tightening of the screw 49 moves the bushing 47 axially in the boss 45 and, by this bushing movement, the taper bore therein moves more tightly onto the taper part 461 of the shaft 46 and moves the entire shaft axially to take up whatever looseness there may be in the taper bearing in the boss 44. By this means, the pivot shaft 46 can always be adjusted so that there is neither end nor side play of the shaft 46 and so that the same may rotate when occasion requires rotation thereof.

The work carrying means, shown as the cradle C, has the bosses 52 and 53 on the bottom thereof and inwardly adjacent to the bosses 44 and 45 with some clearance between the same for structural reasons. The pivot shaft 46 extends through the bosses 52 and 53 and closely engages the same so that there is no lost motion between the shaft and the bosses.

The work carrying element, in the present case the rotatable spindle I, is journaled in the cradle C and is in driving connection with the below described driving and speed change means.

The spindle I is shown as being journaled in the bushings 54 and 55 mounted respectively in the bosses 56 and 57 which form part of the housing J. The handwheel K is secured to the outer end of the spindle as shown to provide a means whereby the spindle can be rotated for rotative adjustment thereof as occasioned by work being done or to be done. The gears 58, 59 and 60, each an individual member and diametrically different from the others are mounted on the spindle and rotate therewith through the key 61. The sleeve 62 is keyed onto the spindle, extends between the outer end of the bushing 55 and the inner end of the hub part of the handwheel K, and has the spindle rotating sprocket wheel 63 on the outer end thereof. The end thrust bearing 64 is shown as being introduced between the hub of the gear 58 and the boss 57 to reduce friction caused by end thrust on the spindle.

The device shown is designed to relieve pistons on sides thereof.

The work holding part or adapter is shown as a round member 65 having the taper surface 651 to engage a centering means on the piston, the part 652 projecting into the piston, and the transversely extending part 653 to engage the wrist pin holes in the piston for rotating the same when the spindle is rotated. The adapter 65 also has the taper end 654 to fit a correspondingly taper hole in the spindle I for centralizing the adapter with the spindle and to drive the adapter to rotate with the spindle.

The tail stock L is adapted and formed to slide quickly on the cradle in a direction in alinement with the axis of the spindle I and has means for quickly clamping the tail stock in an adjusted position thereof as shown. This tail stock structure is of the conventional type and, apparently, needs no specific description herein.

The tail spindle M is axially slidably mounted in the tail stock and the axis thereof is in alinement with the axis of the spindle I. The center 66 projects out of the tail spindle M and engages a center hole in the piston. The taper end 651 and the center 66, engaging corresponding surfaces of the piston, retain the piston in proper and centralized position in the machine.

The inner end of the spindle I is externally threaded and the collar 67 is threaded onto this threaded end. The cam member 68 is centralized on the collar 67 and is shown as being held against rotation thereon by the screws 681 which are tapped into the collar.

The cam member 69 is shown as being keyed onto the stub shaft 691 which is journaled in the bracket 692 and held against endwise movement therein by the washer and nut 693 threaded onto the end of the stub shaft. The bracket is secured to the table B by means of the screws 694 and moves with the table.

The cam members contact each other and, when the outer circumferential surface of each is truly round, such cam structure, of course, produces only truly round and even surfaces on work. When a surface of a different contour is to be formed, the contour of the outer circumferential surface of the cams is changed to suit the contour to be formed. We prefer to retain the cam 69 as truly round but to change the contour of the cam 68 to suit the contour of surface to be formed on work.

Figure 5:
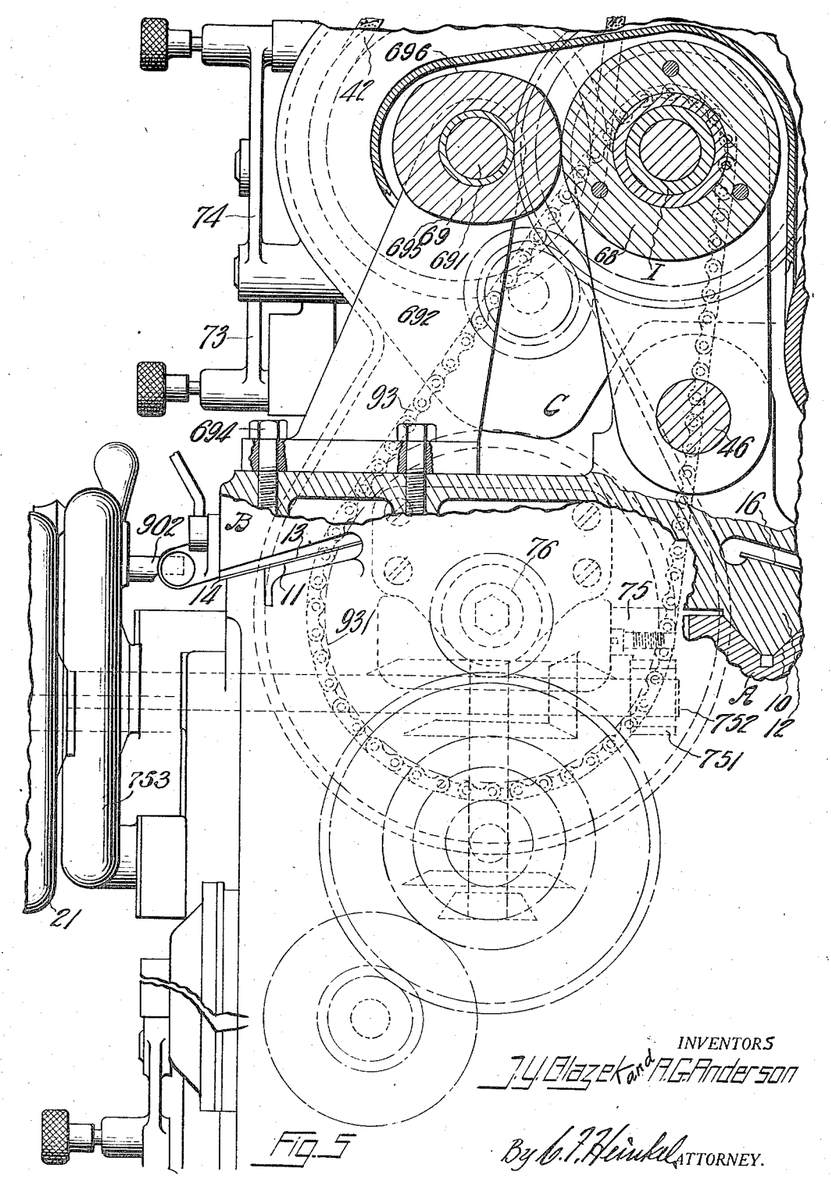
Fig. 5 is an end view on a larger scale of the machine of Fig. 1, partly in section to show structure more clearly; the view being taken from the end Y designated in Fig. 1.
Figure 6:
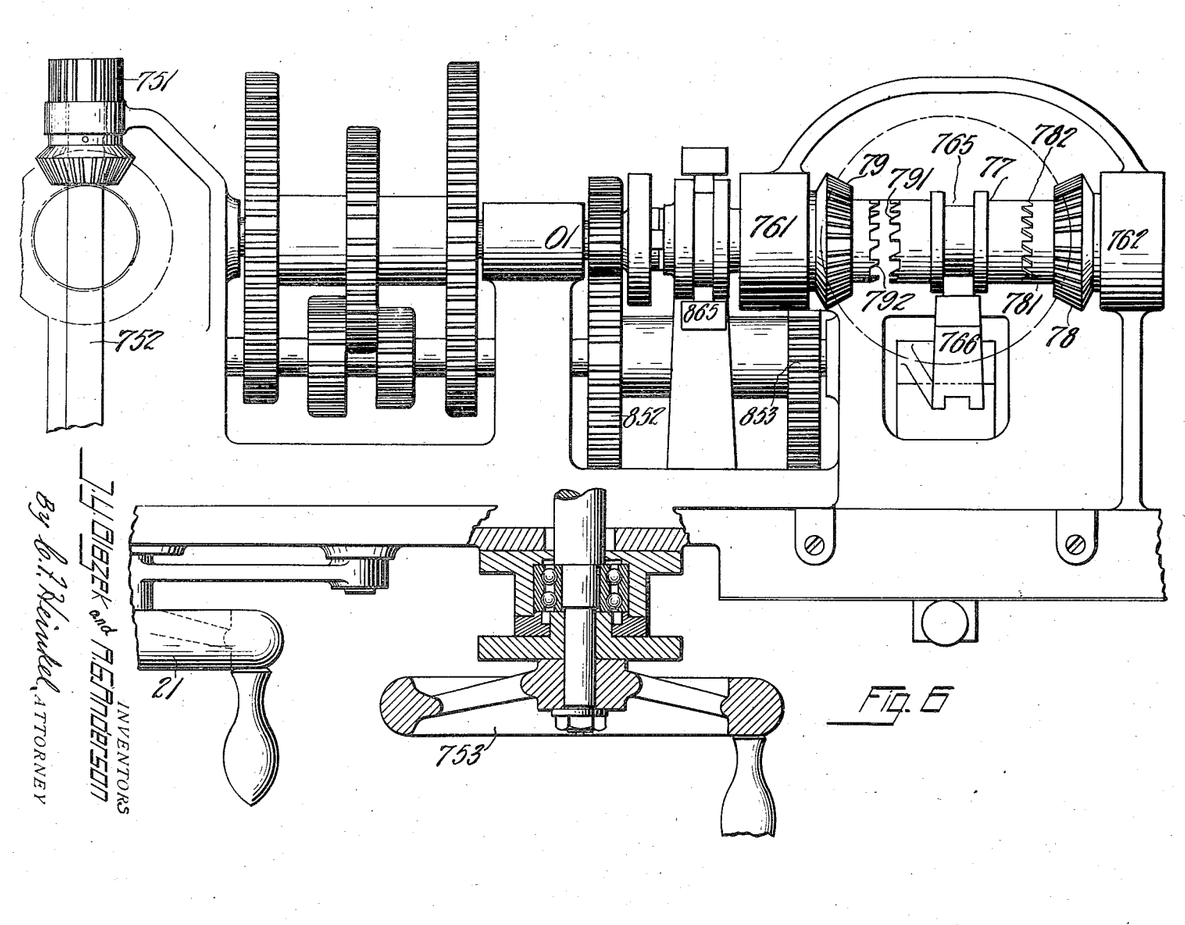
Fig. 6 is a plan view of the gear box on the front of the bed of the machine of Fig. 1 and gears and shafts and clutch therein and is partly in section to show the relation of the carriage moving screw to the gears in the box.

The outer circumferential surface of the cam member 68 is shown in Fig. 5 as being truly round and contacts the cam member 69 which is also truly round of the outer circumferential surface thereof except the relieved parts 695 and 696 on opposite sides thereof. The contour of these relieved parts conforms to the relief to be produced in the piston surface and the truly round part of the cam 69 produces the truly round parts of the piston surface.

It is, of course, obvious that the cam 69 can be formed to produce other surfaces of different contours when used in connection with the round cam 68 and that both cams can be changed for the same purpose.

The motor N is mounted on top of the casing J which contains the speed change means and has the grooved pulley 70 secured to the armature shaft thereof to rotate therewith. The belt 701 engages the pulley 70 and also the grooved pulley 702 which is secured to and rotates the shaft 71 which is journaled in bearings in the casing J. The gear change handle 73 is on the outside of the casing J and is secured to and rotates with the shaft 731 which is journaled in the casing J and has the arm 732 on the inside of the casing and secured to the shaft 731 to be rotatively moved thereby. The free end 733 of the arm 732 is forked to engage both sides of the gear 734 shown as being in mesh with the gear 59 on the spindle I.

Figures 2, 3:
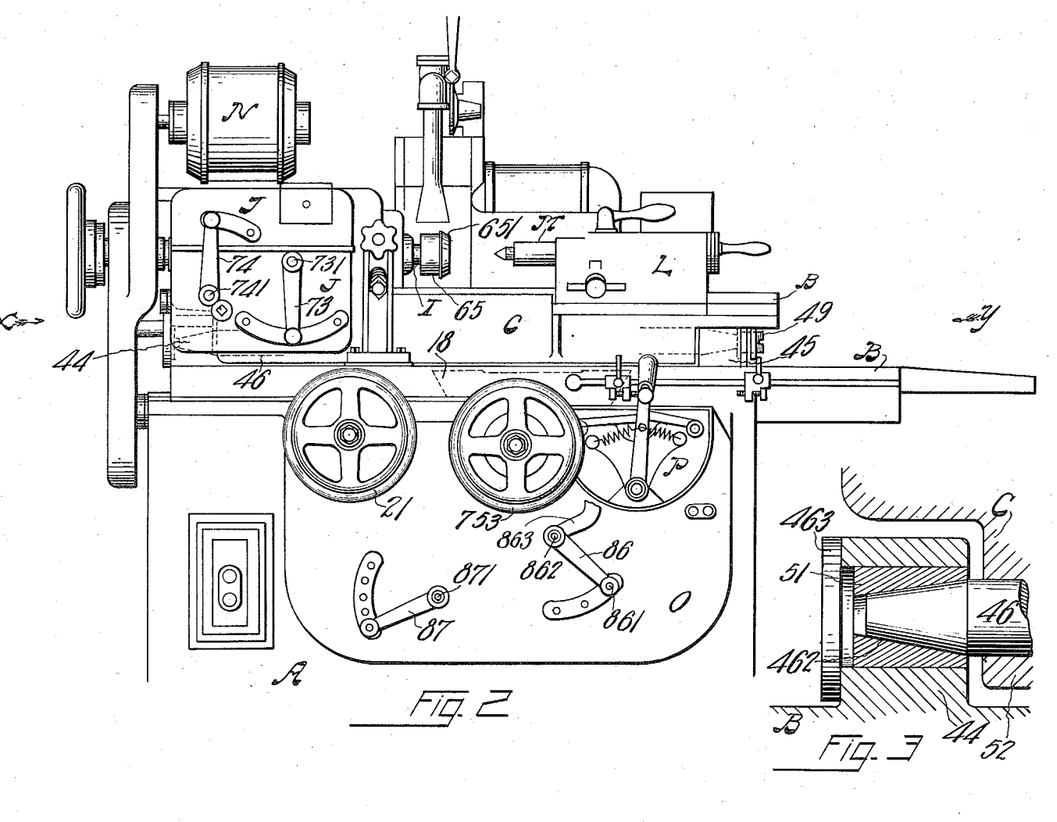
Fig. 2 is a front view of the machine shown in Fig. 1, partly in section to show structure more clearly.
Fig. 3 is a section on a larger scale showing the mounting of the left hand end of the pivot shaft for the cradle.
Figure 4:
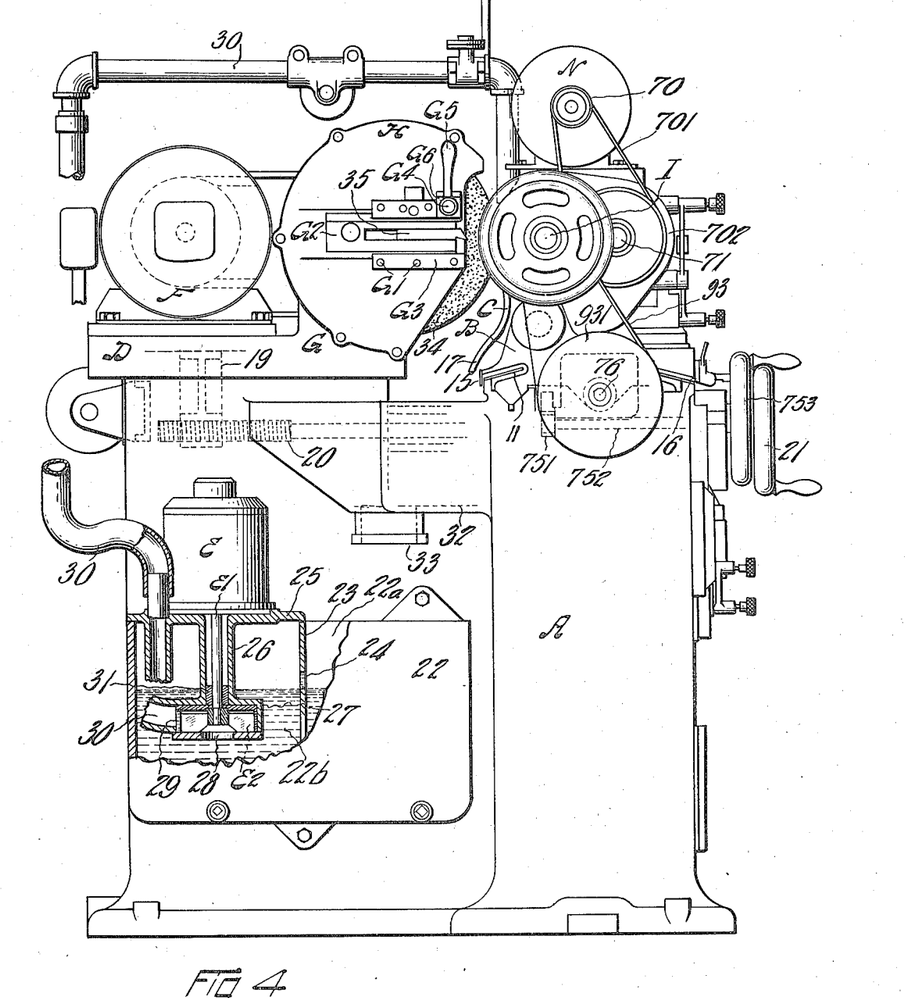
Fig. 4 is an end view of the machine of Fig. 1; the view being taken from the end X thereof.

A swinging movement of the handle 73 (Fig. 2) toward the right and toward the left moves the gear 734 out of mesh with the gear 59 and thereby changes the gear ratio of the spindle driving means and, consequently, the rotative speed of the spindle.

The gear change handle 74 is on the outside of the casing J and is secured to and rotates the shaft 741 which is journaled in the casing J and has the arm 742 on the inside of the casing and secured to the shaft 741 to be rotatively moved thereby. The free end 743 of the arm 742 is forked to engage both sides of the gear 744 which is shown as not being in mesh with any gear in the casing J. A swinging movement of the handle 74 (Fig. 2) shifts gears in the casing for other speed changes of the spindle.

The gearing in the casing J and the manner of shifting the same is of conventional structure and arrangement for such speed changing means and appears to need no further description thereof above what is herein described.

The table B is movable longitudinally on the bed A in reciprocating movement and is moved by means of the rack 75 secured to the table and meshing into the pinion 751 secured to the inner end of the shaft 752 to rotate therewith. The hand wheel 753 is secured to the outer end of the shaft 752 to rotate therewith. The shaft 76 is journaled in the companion bearings 761 and 762 of the bracket 763, forming part of the casing O on the front of the bed, and forming journals and supports for the shaft 76. The clutch sleeve 77 is mounted to slide axially on the shaft 76 and rotates therewith by means of the teeth 764. The clutch sleeve has oppositely driving teeth in the axial ends thereof as shown and also has the circumferential groove 765 in substantially the axial middle thereof to be engaged by the free end of the arm 766.

The bevel gear 78 is journaled in the bearing 762 and on the bushing 781 which also forms the journal for the shaft 76 in this bearing. The end of the hub 782 has clutch teeth therein corresponding to the clutch teeth on one end of the clutch sleeve 77.

The bevel gear 79 is journaled in the bearing 761 and on the bushing 791 which also forms the journal for the shaft 76 in this bearing. The end of the hub 972 has clutch teeth therein corresponding to the clutch teeth in the other end of of the clutch sleeve 77.

The bevel gear 80 is in permanent mesh with both of the bevel gears 78 and 79 and is secured to the upper end of the vertical shaft 801 which is journaled in the bracket 763. The bevel pinion 802 is secured to the lower end of the shaft 801 and meshes into the bevel gear 803 which is secured to and rotates the shaft 81 which has one end thereof journaled in the bracket 763 and the other end thereof in the bearing O1 forming part of the casing O.

The shaft 82 has one end thereof journaled in the bracket 763, the axially middle part thereof journaled in the bearing O2, and the other end thereof journaled in the bracket O3 forming part of the casing O. The table moving shaft 752 has one end thereof journaled in the bracket O3 and the other end thereof journaled in the front wall of the casing O. The shaft 83 has one end thereof journaled in the bearing O1 and the other end therefor journaled in the bracket O3.

The bevel pinion 84 is secured to one end of the shaft 83 to rotate therewith and meshes into the bevel gear 841 which is secured to and rotates with the vertical shaft 842 which is also journaled in the bracket O3. The bevel gear 843 is secured to and rotates with the shaft 842 and meshes into the bevel pinion 844 secured to and rotating with the horizontal shaft 752.

The gear 85 is journaled on the shaft 81 and has the clutch teeth 851 on one end of the hub thereof. The gear 852 is journaled on the shaft 81 and has the clutch teeth 853 on one end of the hub thereof. The gears 821 and 822 are keyed onto the shaft 82 to rotate therewith and to rotate the shaft 82 and the gears thereon.

The clutch sleeve 811 is slidable axially on the shaft 81 between the gears 85 and 852 and is splined onto the shaft 81 to be rotated thereby. The lever 86 is on the outside of the casing O and the free end thereof has the stop pin 861 therein to retain the lever 86 in a position corresponding to a position moved into. The lever 86 is on and rotatively moves the transverse shaft 862. The lever 863 is on and rotatable with the shaft 862 and extends upwardly and above the casing O for easy reach of an operator to move the clutch sleeve for connection with the gears 85 and 852 respectively for moving the table in either direction or to move the same into neutral for stopping movement of the table.

The clutch yoke 864 is on and moves rotatably with the shaft 862. The prongs 865 of the yoke engage the sleeve 811 to slide the same axially on the shaft 81 for selective engagement of the clutch teeth 854 thereon with the clutch teeth 851 on the gear 85 or the clutch teeth 855 thereon with the clutch teeth 853 on the gear 852.

The gears 823, 824 and 825 are movable axially on the shaft 82 and are splined thereon to rotate therewith by means of the feather 826. The lever or handle 87 rotatively moves the shaft 871 and the arm 872 thereon engaging the sides of the gear 824 to move the gear 824 out of mesh with the gear 832 so that a rotative movement of the lever 827, in either direction, first moves gears out of mesh and then into mesh according to movement of the lever respectively with the gears 831, 832, and 833 for different speeds of travel of the table B through the bevel gear 84 on the shaft 83 and the bevel gear 841 on the shaft 842.

The handle 87 is on the outside of the casing O and has one end thereof secured to the stub 871 which is journaled in the casing O. The arm 872 is secured to the inner end of the stub 871 to be rotatably moved thereby upon a rotative movement of the handle 87. The fork 873 is journaled in the upper end of the arm 872 and engages the gear 824 to shift the same, together with the pinions 823 and 825 corresponding to movement of the handle 87. Movement of the handle 87 moves the gear 824 out of its shown mesh with the gear 832 so that no rotative motion is transmitted from the shaft 82 to the shaft 83 or vice versa. A further movement of the handle 87 meshes the pinion 823 with the gear 831 for a certain speed ratio between the shafts 82 and 83.

Another movement of the handle 87 meshes the pinion 825 with the gear 833 which is secured to and rotates with the shaft 83 and thereby attains another speed ratio between the shafts 82 and 83.

Rotary motion is transmitted from the shaft 76, through the speed change gearing in the casing O, to the bevel pinion 84 which transmits its motion to the vertical shaft 842 through the bevel gear 841 and rotates the bevel gear 843 which rotates the bevel pinion 844 and thereby rotates the shaft 752 and the table moving pinion 751 thereon to move the table B longitudinally of the bed.

Figure 7:
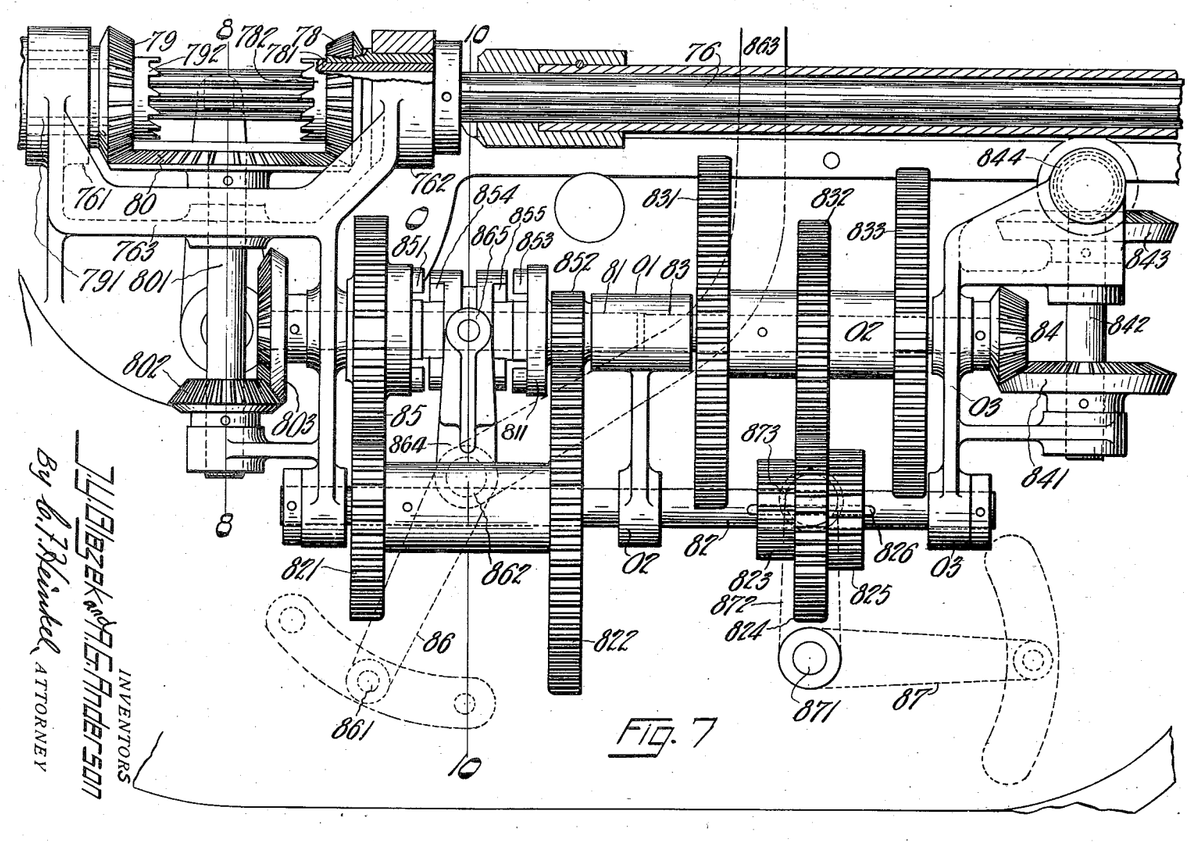
Fig. 7 is a front view of the gears and shaft and clutch relation in the gear box of Fig. 6.
Figures 8, 9:
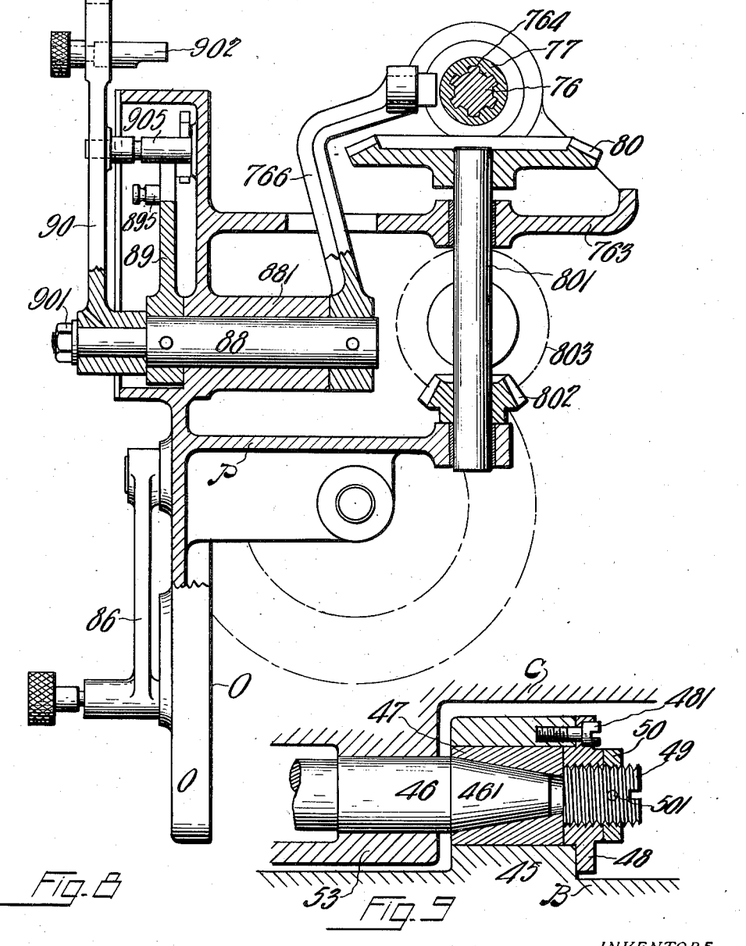
Fig. 8 is a section taken on the line 8 of Fig. 7.

When the handle 86 is in the position shown in Fig. 7 or the handle 87 moved to an off position so that there are no meshing gears in the casing O, the hand wheel 753 can be manipulated manually to move the table B quickly into different longitudinal positions thereof relative to the bed for various purposes.

The casing P extends forwardly from the casing O. The stub 88 is journaled in the boss 881 projecting inwardly of the casing O and has one end thereof extending through the casing P and out of the same at the front thereof. The arm 766 is secured to the inner end of the stub 88 to operate the clutch sleeve 77 as is explained above. The sector 89 is located within the casing and has the hub thereof secured to the stub 88 to rotate therewith. The control handle 90 has the hub thereof journaled on the stub 88 and is held thereon by the nut 901 threaded thereonto.

The contact pin 902 is vertically adjustable in the handle 90 to be contacted by or to clear the adjusting screw 903 carried by the bracket 904 which is adjustable longitudinally of the table to vary the stroke of the table.

The locking pins 891 and 892 are driven into the sector 89, one on each side of the vertical axis thereof. Each of the pins has the substantially horizontal flat face 893 on the top thereof and the substantially vertical flat face 894 on the inner sides thereof. The spring holding pins 895 and 896 are driven into the sector 89 on each side of the vertical axis thereof and outwardly of the locking pins.

Figures 10, 11, 12, 13:
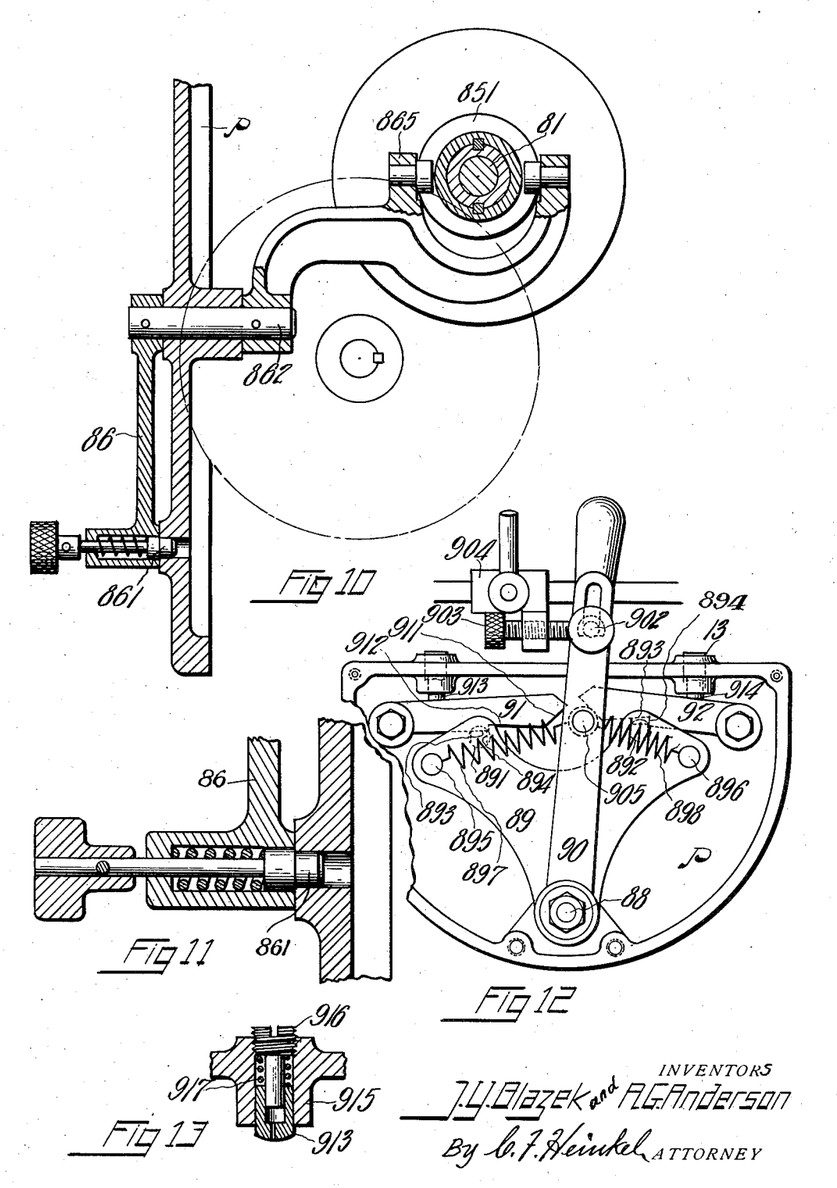
Fig. 10 is a section taken on the line 10—10 of Fig. 7.
Fig. 11 is a fragmentary section on a larger scale of the handle retaining means of Figs. 10 and 8.
Fig. 12 is a front view on a larger scale of the reversing means for movement of the table.
Fig. 13 is a section on a larger scale taken on the line 13 of Fig. 12.

The dog 91 has one end thereof pivotally mounted in the casing P as shown and has the bevel face 911 on the other end thereof and the notch 912 in the bottom edge thereof. The dog 92 is a substantial duplicate of the dog 91; one being pivoted on one side of the vertical axis of the casing P and the other on the other side. Both of the dogs being swiveled on a horizontal axis and each pointing toward the vertical lever 90 (Fig. 12). Normally, the dogs are held down respectively upon the locking pins 891 and 892 by means of the axially movable pins 913 and 914 actuated by the springs 917. These pins 913 and 914 are duplicates so that the following description of one also applies to the other.

The pin 913 is axially slidably mounted in the boss 915. The screw 916 is threaded into the boss and the inner end thereof abuts the end of the spring 917 in the boss, for pressure regulation of the spring. The other end of the spring abuts the inner end of the pin 913. The spring normally tends to force the pin 913 inwardly of the casing and thereby tends to retain the dog downwardly against the locking pin 891 and to keep the dog locked relative to the pin until the lock is released by movement of the handle 90 which swivels the dog upwardly against the action of the spring 917.

The operating pin 905 extends into the casing P and is fixed in the handle 90 in a position to contact the bevel face 911 of each of the dogs. The spring 897 has one end thereof hooked onto the pin 895 and the other end thereof onto the operating pin 905. The spring 898 has one end thereof hooked onto the pin 896 and the other end also hooked onto the operating pin 905.

When the table B moves longitudinally, the screws 903, carried by the table, contact the pin 902 and thereby pivots the handle 90 on the stub 88 but does not move the stub nor the sector rotatively and thereby first puts a tension on the corresponding one of the springs 897 or 898 and the pin 905 thereafter contacts the bevel face 911 on the corresponding dog to release the locking thereof by raising the inner end thereof and thereby release the side wall of the notch 912 from the vertical face 894 to release the locking there whereupon the tension of the spring moves the stub 88 and the arm 766 thereon rotatively and thereby moves the clutch sleeve 77 axially on the shaft 76 and the teeth on the sleeve into engagement with the teeth on one of the bevel gears 78 or 79 as the case may be. This teeth engagement transmits rotation of the shaft 76 to the driving mechanism in the casing O and to the pinion 751 for longitudinal movement of the table.

When the table reaches the end of its stroke, the other screw 903 engages the pin 902 on the handle 90 and repeats the above described operation in a reverse order and thereby moves the arm 766 oppositely and engages the teeth on the other end of the sleeve with the teeth on the other one of the bevel gears and thereby reverses the direction of rotation of the driving mechanism in the casing O and of the pinion 751 and of the longitudinal travel of the table.

This means of reversing the movement of the table is quite simple in structure and practically shock free in its operation which is a decided advantage in such reversing means. The reversing of the table can be averted when desired by moving the pin 902 vertically in its slot to clear the screws 903. A feature of this reversing means is that movement of the table can not lock it against its operation since the dogs can rest on the horizontal faces of the pins 891 and 892 and can not drop below them and the pin 913, pressed by the spring 917 in abutment with the screw plug 916 and with the pin, normally tends to pivot the dogs downwardly against the horizontal faces on the pins sufficiently far to cause locking engagement between the wall of the notch and the wall 894 of the pin 891 or 892. This action is quite positive but can not lend itself for locking the mechanism in the casing O so that proper reversal of movement is always assured.

The chain 93 engages the sprocket 63 and the sprocket 931 which is secured to and rotates with the shaft 76 to impart rotative motion from the spindle to the mechanism in the casing O. This driving means assures positive longitudinal movement of the table relative to rotation of the spindle.

The stock removing means represented by the cutting tool 35, as distinguished from the grinding wheel 34, is mounted in the supporting means G which is shown as extending from the grinding wheel supporting means H. The set screws G1 afford adjustment of the tool 35 relative to its supporting means and to the block G2 which carries the tool and which is slidably mounted in the supporting means G and held therein by the plates G3. The stud G4 is tapped into the supporting means G and the handle G5 is threaded onto the upper end of the stud and acts on the clamping plate G6 to clamp the slide G2 into position adjusted to relative to the supporting means G and to work to be done by the cutting tool. The cutting tool 35 and its supporting means is shown in the drawings as being spaced back of the grinding wheel 34 for the sake of clearness in the drawings. It is, of course, quite obvious that this cutting tool means can be located at any desired place relative to work to be done thereby. This work may be a finishing cut previous to a grinding cut by the wheel 34, or to machine another part of work. When facing is to be done by the tool 35, a conventional feeding means can be connected with the slide G2 to feed the tool 35 for such facing.

Facing of work can also be done by the grinding wheel 34 by feeding the same toward and away from work through the movable carriage D moved by the screw 20 by means of the handwheel 21.

The piston shown in the machine is to have the outer surface thereof formed, is held in the cradle by means of centers, one of which rotates with the spindle and has means thereon to drive the piston rotatively. The spindle is rotated by means of the motor N which drives the gearing in the casing J and drives the spindle at various rotative speeds according to the gears in mesh therewith. The meshing of the various gears is indicated by the pitch circles shown in dot and dash lines in Fig. 5.

The mechanism in the casing O moves the table longitudinally reciprocally on the bed. The mechanism in the casing P reverses rotation of the mechanism in the casing O to reverse movement of the table.

The motor F operates the grinding wheel individually. The motor E operates the lubricant pumping means individually.

The work carrying cradle C is moved relative to the table and is shown as being pivotally movable by being pivoted on the pivot shaft 46 so that the uper work supporting part thereof can move toward and away from the grinding wheel during operation of the machine.

The cooperating cam means, one on the spindle and the other on the bracket fixed on the table, causes the cradle and work thereon to move transversely of the table and toward and away from the grinding and tool means and thereby form surface on the piston or other work carried by the cradle in conformity to the contour of the cam means.

The axis of the pivot shaft 46 is located inwardly of the machine relative to the axis of the spindle. This offset effects that the weight of the cradle is greater on one side of the axis of its swivel pin than on the other. This causes the cam member on the spindle to always keep in contact with the cam member on the table without springs or similar or equivalent means to retain such contact. The stock removing means, represented herein by the cutting tool 35 and the grinding wheel 34, also exert their cutting pressure toward the piston or other work on the cradle and thereby tend to retain the cam member on the cradle in contact on the cam member on the table. However, when conditions arise where this overbalancing of weight can not be carried out conveniently, a spring or similar or equivalent means can be applied to always retain the cam members in contact with each other.

Figures 1, 9, 14:
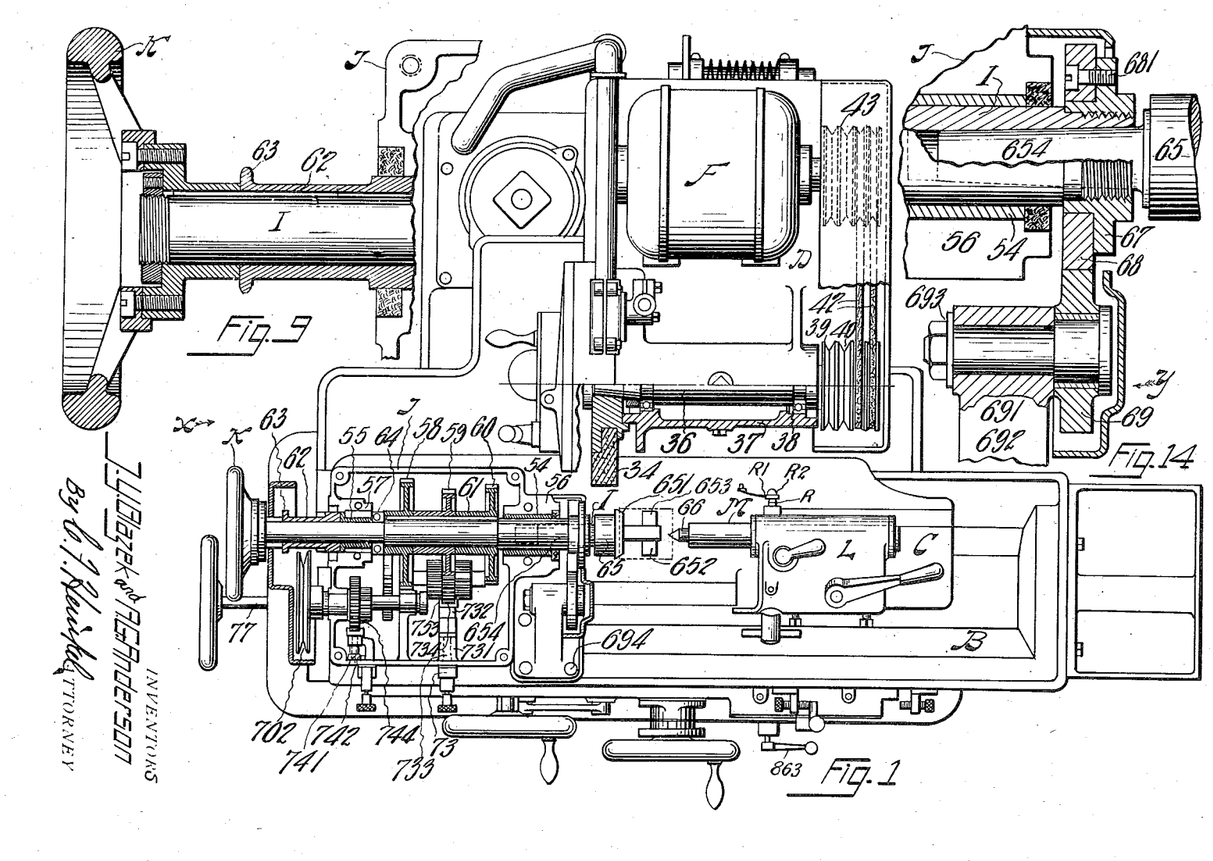
Fig. 1 is a plan view of a machine, embodying the present invention and having means thereon to form the outer circumferential surface of pistons completely with reliefs in sides thereof.
Fig. 9 is a section on a larger scale showing the mounting and adjusting means of the pivot shaft at Y of Fig. 1.
Fig. 14 is a sectional view of a portion of the driving end of the work spindle.

The bracket or holder R, Fig. 1, is a part of the tail stock L. The tool sharpening element R1, which may be an emery wheel dresser or other equivalent element, is attachable to and removable from the bracket and is held or clamped thereto by the clamping element R2.

The object of this bracket is to receive a means for dressing or otherwise sharpening the machining means. With such a holding means, the sharpening means can be held steadily and moved into various positions relative to the machining means for sharpening or trueing up thereof and is quickly movable with the tail stock.

The machine shown and described herein is efficient in operation, forms surfaces of various contours predetermined by formation of the cam means of the machine.

Applicants are fully aware that the present invention can be applied to machines other than the one shown and described and that the principle of the present invention can be embodied in structures other than the structure herein shown and described and changes and modifications can be made in the structure and arrangement and combination of the elements shown and described within the scope and spirit and intent of the present invention and the appended claims.

Therefore, without limiting ourselves to the precise application of our invention nor to the precise structure and arrangement and combination of elements as shown and described,

We claim:

1. A surface forming machine having a bed, a work carrying element movable transversely and longitudinally relative to said bed, a carriage movable transversely on said bed, a stock removing means on said carriage to operate on work in said work carrying element, a motor on said carriage to operate said stock removing means, a moving means for said table including a motor mounted thereon, and speed change means between said motor and said table moving means to change speed of movement of said table.

2. In a surface forming machine, a rotatable shaft, an oscillating work holding element, a machining tool on one end of said shaft to rotate therewith and to operate on the work, a pulley on the other end of said shaft to rotate therewith and having a plurality of grooves in the outer circumferential surface thereof, a motor to rotate said shaft, a pulley on and rotating with the armature shaft of said motor and having a plurality of grooves in the outer circumferential surface thereof, and a belt engaging corresponding of said grooves in each of said pulleys.

3. In a surface forming machine, a bed, a table movable on said bed, a cradle pivotally movable on said table to pivot transversely thereof and by gravity in one direction, a work receiving means mounted on said cradle, means to pivot said cradle in the opposite direction by and during operation of the machine, and a stock removing means to operate on the work in said work receiving means while said means to pivot is pivoting said cradle.

4. A means to receive and dispense lubricant having a pan to hold lubricant, a division wall in said pan dividing the same into two compartments, a hole through said wall near the top thereof, a drain pipe feeding lubricant into one of said compartments, a pump in the other one of said compartments and having the inlet thereof located below said hole, a pipe leading from the outlet of said pump to a point of discharge, a motor mounted on the top of said pan over said other compartment, the armature shaft of said motor extending into said other compartment and the end thereof in driving connection with the rotor of said pump, a sleeve extending into said other compartment to steady said extended armature shaft, and a bushing in said sleeve to form a journal for said extended shaft and made of material which resists action by said lubricant.

5. A means to receive and dispense lubricant having a pan to hold lubricant, a division wall in said pan to divide the same into two compartments, a hole through said wall near the top thereof to establish communication between said compartments, a cover for one of said compartments, a sleeve extending from said cover into said one compartment, a pump casing on the inner end of said sleeve, a motor centralized on said cover and having the armature shaft thereof extending through said sleeve and into said pump casing, a pump rotor within said casing and secured to the end of said armature shaft, the inlet for said casing being located below said hole, and a pipe leading from the outlet for said casing to a point of discharge.

6. A surface forming machine having a bed, a table movable reciprocatingly on said bed, and a reciprocating means for said table having a driving shaft and contact elements on said table, a shaft in geared engagement with said table to move the latter, opposing bevel gears each rotatable on said driving shaft, a clutch on said shaft between and engageable with both of said bevel gears individually, a stub journaled in said bed, a reversing lever journaled on the other end of said stub, a sector on and rotatable with said stub, a contact pin projecting inwardly from said reversing lever and transversely of said sector, a spring at each side of said reversing lever, one end of each of said springs being hooked onto said contact pin, the other end of each of said springs being hooked onto said sector, a holding pin driven into said sector at each side of said reversing lever, a pair of dogs each having one end thereof pivoted on a fixed pin, one at each side of said reversing lever and the other ends thereof to engage and disengage said contact pin, and a notch in each of said dogs to engage said holding pins to lock the table reversing means until released by movement of said table.

7. A reciprocating table, a tool means to form work, a work carrying means rockable in opposite directions transversely of movement of said table, a cam member on said work carrying means, a cam member fixed relative to said work carrying means, and gravity of said work carrying means combined with cutting pressure of said tool means holding said cam members in contact so that rotation of the firstly mentioned cam member causes rocking of said work carrying means for formation of surface on the work.

8. In a surface forming machine, a bed and a work support, a rotatable tool means to operate on work in said work support, a carriage axially movable transversely of said bed and carrying said tool means to move the same toward and away from work in said work support, a motor on said carriage and having the axis thereof spaced laterally of the axis of said tool means, both of said axes being fixed, a driving means from said motor to said tool means, and means to move said carriage to move said tool means and thereby also move said motor and retaining said axes in said fixed positions.

9. In a surface forming machine, a bed and a work support, a rotatable tool means to operate on work in said work support, a carriage movable transversely of said bed and carrying said tool means to move the same toward and away from the work, a motor on said carriage and means having the axis thereof spaced laterally of the axis of said tool, both of said axes being fixed, a plurality of V belts between said motor and said tool means, driven by said motor and driving said tool means, and means to move said carriage to move said tool means and thereby also move said motor and retain said axes in said fixed positions.

10. In a surface forming machine a, shaft, an accurately movable work carrying element pivotally carried by said shaft and in operative relation to a stock removing means, and a single screw to take up side and end play of said shaft and to maintain accurate pivotal movement of said element.

11. A shaft, a pivotally, accurately movable work carrying element on said shaft, and a single screw means to take up side and end play of said shaft to retain accurate rocking movement of said element.

12. A shaft, a pivotally movable element on said shaft, and an adjusting means for side and end play of said shaft comprising, two oppositely tapered portions on said shaft, two spaced bosses, a bushing in one of said bosses and having a taper bore corresponding to the taper of one of said taper portions, a bushing in the other one of said bosses and having a taper bore corresponding to the taper of the other one of said taper portions, a washer on an end of one of said bosses and having an internal threaded opening therethrough, and a screw threaded into said opening and abutting said bushing in said one boss.

13. A surface forming machine having a machining means, a work supporting means mounted to rock relative to said machining means, a tail stock movable relative to work on said work supporting means to steady work thereon and engage and disengage the work and also movable relative to said machining means, a holder receiving means on said tail stock, and a sharpening element for said machining means removably held by said holder receiving means.

14. In a surface forming machine, a work holding means, movable laterally only and held against axial movement, rockable on an axis parallel with the axis of said work holding means, a rocking means for said work holding means operated in one direction by gravity of said work holding means and in the opposite direction by a positive mechanical means, tool means to operate on the work, and rotatable cam means to limit the rocking and thereby change the distance relation between said tool means and the work during operation of said tool means on the work.

15. In a surface forming machine, a bed, a stock removing means carried by said bed, a shaft longitudinally of said bed, an element carried by said shaft and being rockable about the axis of support thereof in opposite directions transversely thereof toward and away from said stock removing means for formation of surface on a work piece by said stock removing means, a work carrying spindle journaled in said element and being located at one side of the center of gravity of said element, a cam to rock said element in one direction, and permitting the gravity of said work carrying element to rock the same in the opposite direction and the cam limiting the rocking of the work.

16. In a surface forming machine, a bed, a stock removing means mounted on said bed, a table supported on and movable longitudinally of said bed for machining of work, a shaft longitudinally of said bed, a work carrying element carried by said shaft and being rockable about the axis thereof in opposite directions transversely thereof toward and away from said stock removing means for formation of surface on a work piece by said stock removing means, said axis being located at one side of the center of gravity of said work carrying element, a cam to mechanically rock said work carrying element in one direction and permitting the gravity of said work carrying element to rock the same in the opposite direction and the cam limiting the rocking in that direction.

17. In a surface forming machine, a bed, a table movable longitudinally on said bed for part formation of surface of a work piece, a stock removing means on said bed, a shaft longitudinally of said bed, a work carrying element carried by said shaft and being rockable about the axis thereof in opposite directions, transversely thereof toward and away from said stock removing means for part formation of the surface on the work piece by said stock removing means, said axis being located at one side of the center of gravity of said work carrying element, a cam fixed to said table, a companion cam on said work carrying element contacting said fixed cam to rock said work carrying element in one direction, and the gravity of said work carrying element rocking the same in the opposite direction and said fixed cam limiting the rocking of said work carrying element.

18. In a surface forming machine, a bed, a table movable longitudinally on said bed for part formation of surface on a work piece, a stock removing means on said bed, a shaft longitudinally of said bed, a cradle carried by said shaft and being rockable about the axis thereof in opposite directions toward and away from said stock removing means for formation of the surface on the work piece by said stock removing means, said axis being located at one side of the center of gravity of said cradle, a rotatable work carrying spindle mounted in said cradle, mutually contacting cams respectively on said table and on said spindle, the contour of the contacting cam surfaces of said cams determining the rocking of said cradle and formation of the surface on the work piece by said stock removing means, and the machining pressure of said stock removing means and the gravity of said cradle co-operating to keep said cam surfaces in contact.

19. In a surface forming machine, a work carrying cradle rockable about an axis located at one side of the center of gravity of the cradle, cams having permanently contacting cam surfaces formed to rock said cradle and thereby control the contour formation of a surface on work, a stock removing means to operate on the work, and the machining pressure of said stock removing means and the gravity of said cradle co-operating to keep said cam surfaces in contact.

20. On a surface forming machine, a bed, a table on and reciprocatingly movable longitudinally of said bed, a work carrying element rockable transversely of said table and about an axis located at one side of the center of gravity of the element, rotatable cams having permanently contacting cam surfaces formed to rock said work carrying element and thereby control the contour formation of a surface on a work piece, a stock removing means to operate on a work piece, the operating pressure of said stock removing means and the gravity of said work carrying element co-operating to keep said cam surfaces in contact, and means for reciprocatingly moving said table and thereby co-operate with the rocking of said work carrying element for formation of surface.

21. In a surface forming machine, a rockable work holding element, a tool means to operate on surface of a work piece held in said element, rotatable, contacting cams formed to guide the rocking of said element for forming a surface on the work piece, said element being rockable on an axis located sidewise of the center of gravity thereof, and the gravity of said element together with the operating pressure of said tool means co-operating to retain said cams in contact.

22. In a surface forming machine, a work carrying member, rockable in opposite directions and rocked in one direction by the gravity thereof, a stock removing means at one side of the work, and mutually contacting cams one on said work carrying member and the other fixed at a side of the work carrying member adapted to control the rocking of said work carrying member for formation of surface of work; the rocking of said member being effected by rotation of said cams and gravity of said work carrying member and operating pressure of said stock removing means; said cams being formed to rock said work carrying member according to a contour of surface to be formed on the work.

23. In a surface forming machine, a bed, a head stock pivotally mounted and eccentrically pivoted for rocking thereof transversely of said bed, a work carrying spindle rotatable in said head stock, a tool mounted on said bed to operate on work carried by said spindle, a roller rotating on an axis fixed at one side of the axis of said head stock, and a cam on said spindle and permanently contacting said roller to rock said head stock and said spindle therein in one of said transverse directions and the gravity of the mass of said head stock moving the latter in the opposite transverse direction and tending to keep said cam and roller in contact.

24. In a surface forming machine, a bed, a head stock mounted to rock transversely of said bed in opposite directions, toward and away from a tool on said bed, on an axis fixed relative to said bed, a work carrying spindle journaled in said head stock and rocking therewith, a bracket fixed to said bed at a side of said head stock, a roller journaled on said bracket, a cam on and rotatable and rocking with said spindle and having a peripheral cam surface in permanent contact on the peripheral surface of said roller, said peripheral surface of the cam being formed in replica of surface to be formed and rocking said spindle in one direction and permitting the gravity of the mass of said head stock to rock the same in the opposite direction so that the tool forms the surface of work in said spindle according to the peripheral surface on said cam.

25. In a surface forming machine, a bed, a head stock eccentrically mounted to rock transversely of said bed in opposite directions, a work carrying spindle journaled in said head stock and rocking therewith, a motor mounted on said head stock to rotate said spindle, a surface forming tool mounted on said bed at one side of said head stock and of said spindle and of work carried by said spindle, and a cam means operated by rotation of said spindle and including a cam member fixed relative to said bed, a cam member fixed to said spindle to rotate therewith, the cam surfaces of both of said cam members being in permanent contact and being formed in replica of surface to be formed, and the rotation of said spindle and cam member thereon rocking said head stock in one direction and permitting the gravity of the mass of said head stock to rock the latter in the opposite direction and thereby form the surface of work according to the form of said cam surfaces.

26. In a surface forming machine, a bed, a head stock eccentrically mounted to rock in opposite directions transversely of said bed, the axis of rocking of said head stock being fixed relative to said bed and being below and at one side of the center of the mass of said head stock, a work carrying spindle journaled in the upper part of said head stock and rocking therewith, a surface forming tool on said bed in operative relation to the work carried by said spindle, and contacting cams, one being rotatable and positionally fixed relative to said bed and the other on and rotatable with said spindle, the contacting cam surfaces of said cams being formed in replica of surface to be formed on the work, and rotation of said spindle and cam thereon rocking the upper part of said head stock and said spindle laterally of the axis of said positionally fixed cam and toward said tool and the gravity of the mass of said head stock and said spindle therein rocking said spindle away from said axis for forming the surface according to the contour of said cam surfaces.

27. In a surface forming means, a bed, a work carrying head stock eccentrically mounted on said bed to rock relative thereto in opposite directions transversely of said bed for surface forming, a cutting tool on said bed at one side of said head stock, a grinding tool on said bed at the same side as said cutting tool and next thereto longitudinally of said bed, and a cam means operated by said head stock and rocking the same mechanically in one direction and permitting the weight thereof to rock the same in the opposite direction.

28. In a surface forming device, a rotatable work carrying spindle mounted to rock in opposite directions and having a cam member mounted thereon, cutting and grinding tools mounted at one side of said spindle to operate on work carried thereby, and a positionally fixed cam member at the other side of said spindle and sidewise abutting the first mentioned cam member so that rotation of said spindle rocks the same mechanically in one direction and permits rocking thereof in the opposite direction by the weight of said spindle and the weight thereon.

JOHN Y. BLAZEK.
RUSSELL G. ANDERSON.